United States Patent
Eklund et al.

(10) Patent No.: US 7,814,034 B2
(45) Date of Patent: Oct. 12, 2010

(54) METHOD AND SYSTEM FOR AUTOMATICALLY DEVELOPING A FAULT CLASSIFICATION SYSTEM BY SEGREGATION OF KERNELS IN TIME SERIES DATA

(75) Inventors: Neil Holger White Eklund, Schenectady, NY (US); Weizhong Yan, Clifton Park, NY (US); Varma Anil, Clifton Park, NY (US); Piero Patrone Bonissone, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 803 days.

(21) Appl. No.: 11/755,893

(22) Filed: May 31, 2007

(65) Prior Publication Data

US 2009/0132855 A1    May 21, 2009

Related U.S. Application Data

(60) Provisional application No. 60/803,604, filed on May 31, 2006.

(51) Int. Cl.
*G06E 1/00*    (2006.01)
*G06F 15/18*    (2006.01)
(52) U.S. Cl. ............................... 706/15; 706/14; 714/26
(58) Field of Classification Search .................... 706/15
See application file for complete search history.

(56) References Cited

U.S. PATENT DOCUMENTS 5,465,321 A * 11/1995 Smyth ........................ 706/20
6,735,550 B1 * 5/2004 Weekley et al. ............. 702/182

OTHER PUBLICATIONS

Tsay, Outliers, Level Shifts, and Variance Changes in Time Series, Journal of Forecasting, vol. 7, pp. I-20, 1988.*

Hetland, Evolving Sequence Rules, Faculty of Information Technology, Mathematics and Electrical Engineering Department of Computer and Information Science, 2003.*

* cited by examiner

*Primary Examiner*—Donald Sparks
*Assistant Examiner*—Nathan H Brown, Jr.
(74) *Attorney, Agent, or Firm*—Bracewell & Giuliani LLP (57) ABSTRACT

A method and system for automatically developing a fault classification system from time series data. The sensors need not have been intended for diagnostic purposes (e.g., control sensors). These methods and systems are functionally independent of knowledge related to a particular equipment system, thereby allowing seamless application to multiple systems, regardless of the suite of sensors in each system. Because this algorithm is totally automated, substantial savings in time and development cost can be achieved. The algorithm results in a classification system and a set of features that might be used to develop alternative classification systems without human intervention.

20 Claims, 5 Drawing Sheets

METHOD AND SYSTEM FOR AUTOMATICALLY DEVELOPING A FAULT CLASSIFICATION SYSTEM BY SEGREGATION OF KERNELS IN TIME SERIES DATA

RELATED APPLICATIONS

This application claims the benefit of U.S. Provisional Patent Application No. 60/803,604 filed on May 31, 2006 and entitled "AUTOMATED KERNEL EXTRACTION SYSTEM AND APPROACH FOR FINDING DISCRIMINATORY FEATURES", which is hereby incorporated by reference in its entirety for all purposes.

This application is related to U.S. patent application Ser. No. 13/000,001 filed on May 31, 2007 and entitled "SYSTEM AND METHOD FOR DEFINING NORMAL OPERATING REGIONS AND IDENTIFYING ANOMALOUS BEHAVIOR OF UNITS WITHIN A FLEET, OPERATING IN A COMPLEX, DYNAMIC ENVIRONMENT", which is hereby incorporated by reference in its entirety for all purposes.

This application is related to U.S. patent application Ser. No. 13/000,002 filed on May 31, 2007 and entitled "A METHOD AND SYSTEM OF CREATING HEALTH OPERATING ENVELOPE FOR DYNAMIC SYSTEMS BY UNSUPERVISED LEARNING OF A SEQUENCE OF DISCRETE EVENT CODES", which is hereby incorporated by reference in its entirety for all purposes.

This application is related to U.S. patent application Ser. No. 11/682,025 filed on Mar. 5, 2007 and entitled "Kernel Split Find: A Method for Fault Detection and Localization in Time Series and Spatial Data", which is hereby incorporated by reference in its entirety for all purposes.

TECHNICAL FIELD OF THE INVENTION

The present invention relates generally to fault detection, and more particularly, a system and method for automatic kernel extraction system and approach for finding discriminatory features.

BACKGROUND OF THE INVENTION

Management of sustainment costs on expensive platforms calls for a predictive health management capability to drive logistics. One approach to cost containment is to design algorithms that are platform-neutral. These algorithms are functionally independent of knowledge related to a particular platform, thereby allowing seamless application to another platform without adding new sensors. This calls for a translation of existing control systems data into diagnostic and prognostics indicators. This also requires the development of new diagnostic and prognostic algorithms that can reason with data not originally designed to be predictive in nature.

Abnormal condition detection is an important first step in system prognosis. Abnormal conditions, also known as faults, are the first sign of a potential equipment failure at some future time. The direct cost of equipment failures is unavoidable: ultimately, the component must be replaced. However, there are indirect costs to equipment failure that are in many cases far greater than the cost of the repair. One source of indirect costs is secondary damage—e.g., component failure in the compressor stage of a gas turbine often causes damage to the rear stages. Another indirect cost is unscheduled maintenance. Generally replacement of a faulty component Before failure during scheduled maintenance is far less expensive than to have a component fail and have to shut the whole system down (e.g., power generation); moreover, guaranteed uptime is sometimes written into service contracts. Thus, for many systems there is considerable economic motivation to detect faults early and accurately.

Condition-based systems depend on reliable fault diagnostics to initiate the prognostic algorithms. Therefore optimization of the diagnostic capability to attain optimal prognostics becomes of greater importance. If diagnostics recognizes the start point of damage too late, the damage propagation models may lag reality and keep underestimating the damage. If prognostic algorithms are kicked off when there is no real damage, the benefit of true remaining life estimate is erased.

Developing a new fault classification system for each physical system (e.g., aircraft, rocket launcher, golf cart, etc.) developed with single or multiple sensors (temperatures, pressures, speeds, etc.) is a costly labor intensive process. Typical steps in fault detection include sensor validation, pre-processing, feature extraction, classification, and perhaps post-processing.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGS., like numerals being used to refer to like and corresponding parts of the various drawings.

Embodiments of the present invention provide a system to automatically find highly discriminatory features in labeled (nominal, fault 1, fault 2, etc.) data and build accurate fault detection and diagnosis system would result in a significant time and cost savings. These discriminatory features may be used to develop accurate classification systems. Such classification systems may be applied to fault diagnosis without requiring human intervention. These multiple time series of data may be a series of machine sensor data inputs, status messages, or ether like conditions which may be sensed. Specific embodiments may analyze sensor data from devices such as an aircraft engine, car engine, launcher system, or any other type system to which sensors may be applied.

Additionally, this embodiments of the present invention may rely upon and utilize algorithms described in US patent application "Kernel Split Find: A Method for Fault Detection and Localization in Time Series and Spatial Data", RD35731 disclosed Feb. 17, 2006 which is hereby incorporated by reference in its entirety for all purposes.

Figure 1:
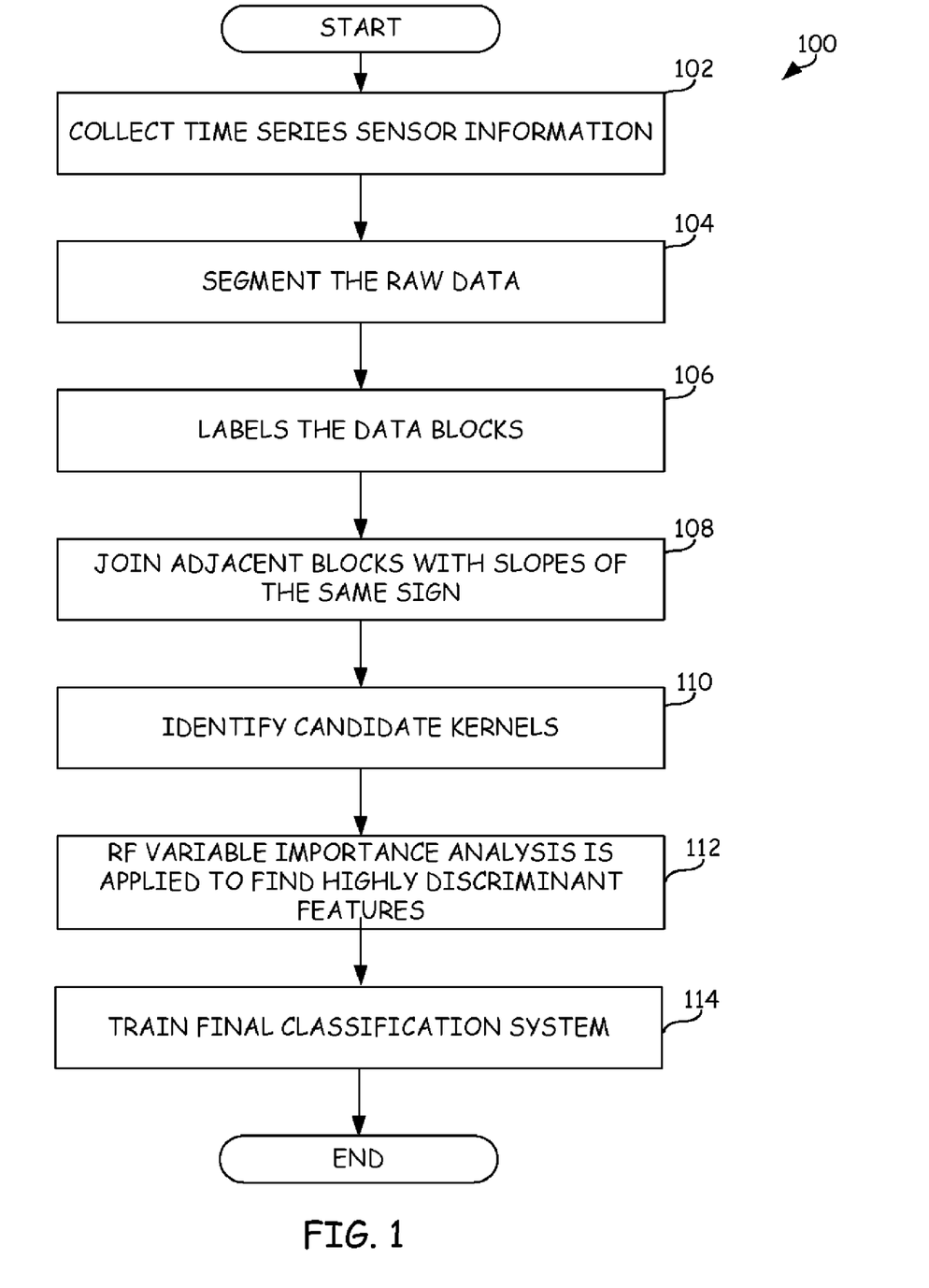
FIG. 1 provides a logic flow diagram of a process to develop a fault classification system from time series data in accordance with embodiments of the present invention.

FIG. 1 provides a logic flow diagram of a process to develop a fault classification system from time series data in accordance with embodiments of the present invention. This method is functionally independent of knowledge related to a particular equipment system, thereby allowing seamless application to multiple systems, regardless of the suite of sensors in each system. Because embodiments of the present invention may be totally automated, substantial savings in time and development cost can be achieved. The algorithm results in a classification system and a set of features that might be used to develop alternative classification systems without human intervention.

Operations 100 begin with step 102 where sensor (pressure, temperature, speed, etc.) data is collected in a time series format (e.g., sampled at regular intervals), with each series labeled either normal, or one of one or more possible faults. In step 104 the process segments the raw data into blocks that are uniform in slope with respect to time (e.g., using the kernel split find (KSF) procedure). Step 106 labels the blocks as having a rising, falling, or flat slope. Step 108 joins adjacent blocks with slopes of the same sign. Then step 110 identifies candidate kernels. In step 110, data is convolved with candidate kernels. RF variable importance analysis is applied in step 112 to find highly discriminant features. These are then used in Step 114 to train the final classification system. Each of these steps is described in detail below.

Figure 2:
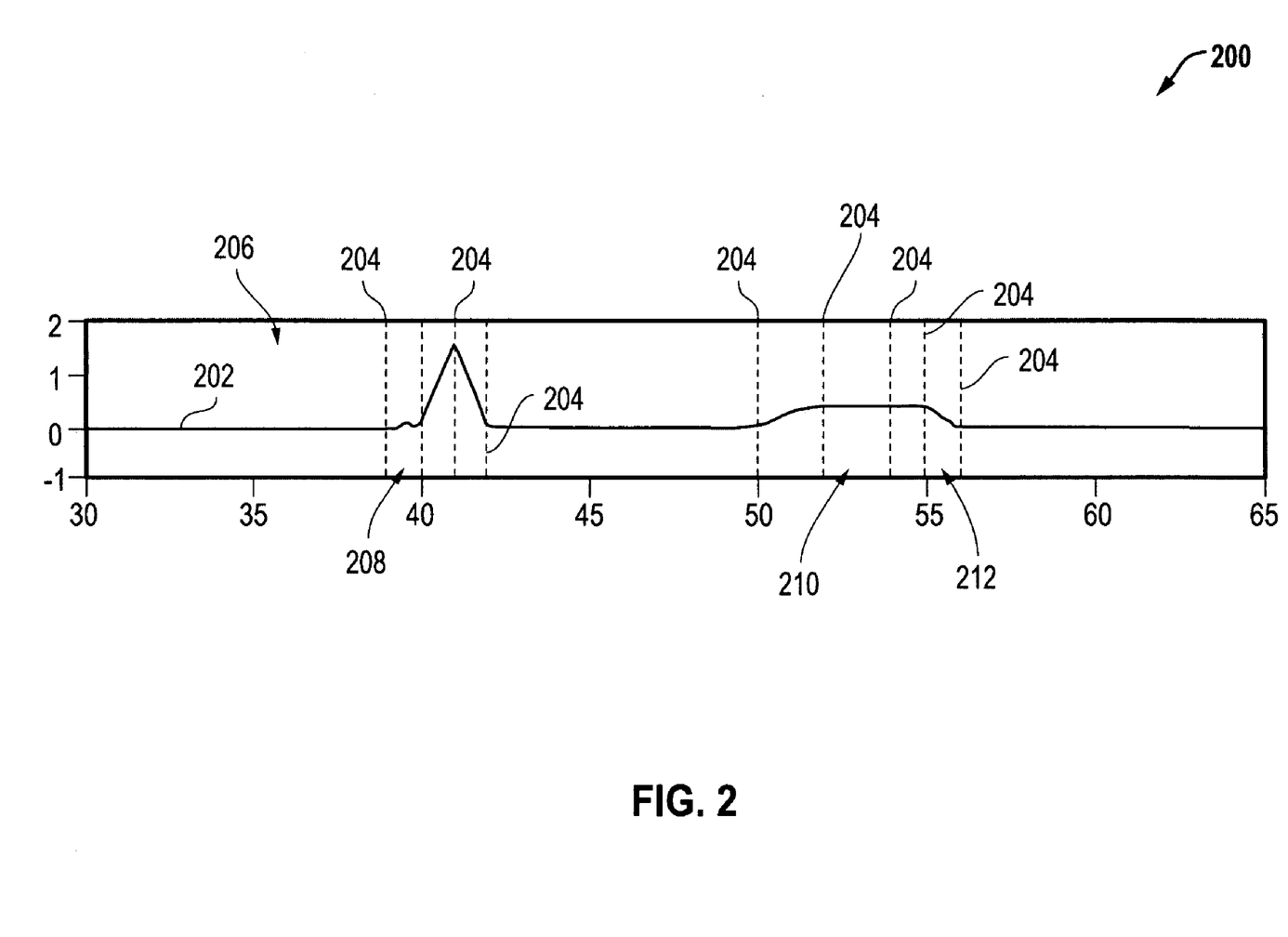
FIG. 2 shows data segmented into blocks of substantially uniform slope in accordance with embodiments of the present invention.

Block Segmentation in step 104 segments the raw data into blocks that are uniform in slope with respect to time (FIG. 2). FIG. 2 shows data as line 202 and lines 204 that segment data into blocks of uniform slope in accordance with embodiments of the present invention.

One approach for doing this is the Kernel Split Find (KSF) algorithm described in US patent application "Kernel Split Find: A Method for Fault Detection and Localization in Time Series and Spatial Data", which is hereby incorporated by reference in its entirety for all purposes, but other methods exist. Care should be taken that whatever method used is resistant to outliers.

The Kernel Split Find (KSF) algorithm identifies and localizes changes in time series or spatial data. An outline of algorithm is as follows:
1. smooth the data using Nadaraya-Watson regression
2. label the first and last points "split points"
3. linear fit to split points in time order
4. calculate residual between linear fit and smoothed data
5. if maximum absolute residual>threshold
   a. label time step corresponding to maximum absolute residual as split point
   b. return to step 3

Labeling of the slope of the blocks in Step 106 allows each block to be labeled as either rising (positive slope), falling (negative slope), or flat (approximately zero slope). The same method used for slope classification (e.g., fuzzy logic) can be used to assign labels. Some tolerance around zero slope should be employed. There are a number of ways to do this, including statistical criteria, manually set thresholds, or fuzzy logic.

Figure 3:
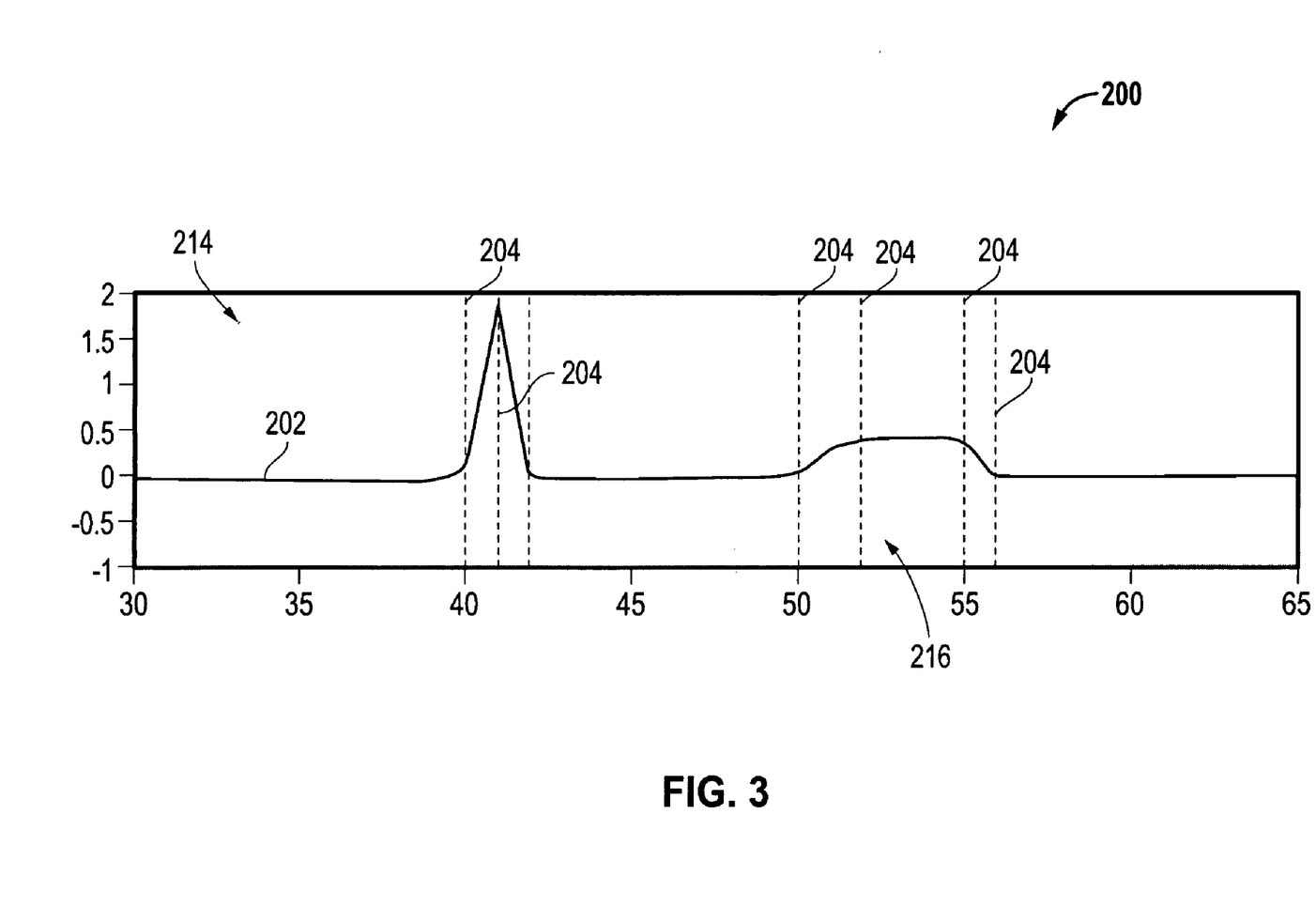
FIG. 3 shows adjacent data blocks having slopes of the same sign combined in accordance with embodiments of the present invention.

Step 108 joins Adjacent Blocks with Slopes of the same sign as shown in FIG. 3. FIG. 3 in combination with FIG. 2 demonstrates that depending on the sensitivity of the block segmentation algorithm used and the nature of the data, it is possible that unnecessary blocks will be introduced. To minimize the effect of this, adjacent blocks with slope of the same sign are combined. In FIG. 3 the data from FIG. 2 has had this procedure applied where blocks 206 and 208 have been combined into block 214; and blocks 210 and 212 have been combined into block 216.

Figure 4:
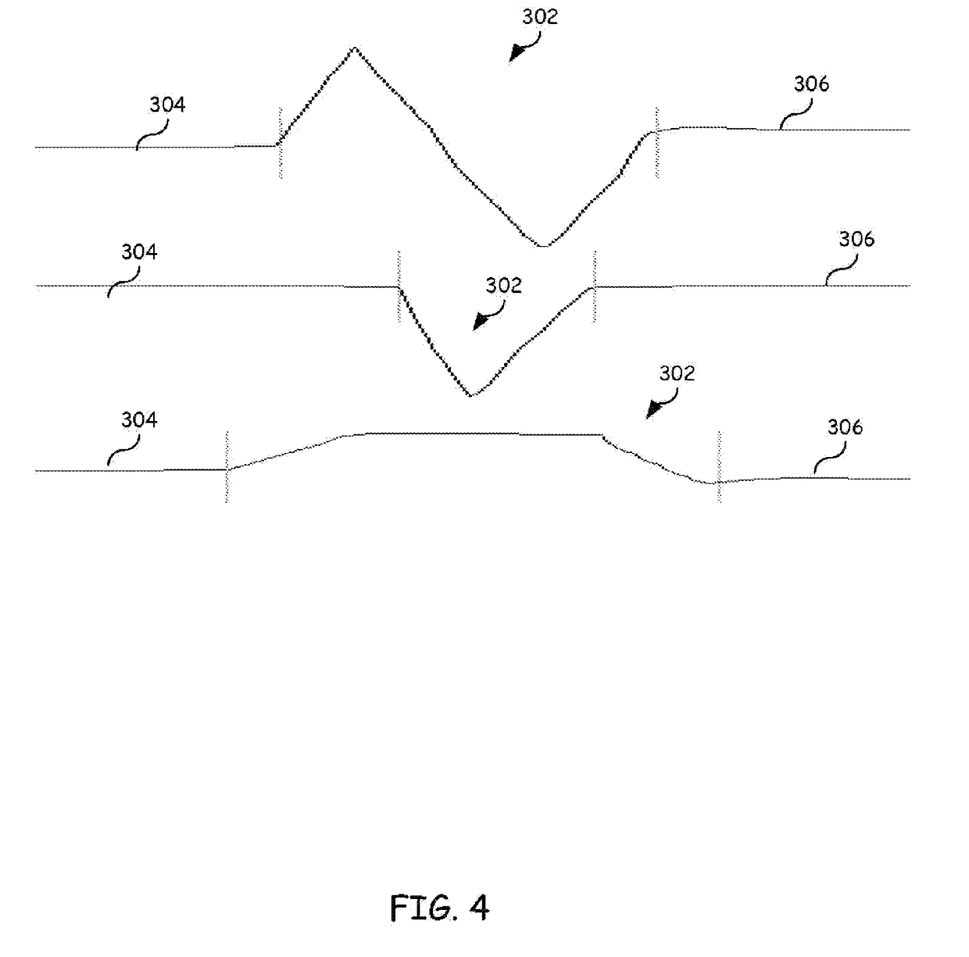
FIG. 4 is an example of three possible kernels in accordance with embodiments of the present invention.

Step 110 identifies the candidate kernels using the remaining blocks. Kernels 302 are defined as regions containing at least one region of non-zero slopes between regions of zero slope. FIG. 4 is an example of three possible kernels 302. The leading flat segment 304 and trailing flat segment 306 are stripped from each kernel.

Once the candidate kernels have been identified they are convolved with the data for the same sensor for all cases (faulty and non-faulty) in step 112. The maximum value of each kernel convolved with the time series is used as a feature for classification.

One might in principal use any feature selection method in step 112 in order to determine which kernels have discriminatory power (e.g., evolutionary algorithms in combination with neural networks, to name one). A very fast and effective way to select good features is to use the variable importance statistic from the Random Forests (RF; Breiman, 2001) algorithm, or other like techniques known to those having skill in the art. The RF algorithm takes very little time to train, is very accurate, and is produces a measure of variable importance (see Breiman (2001) for details). By iteratively dropping the least important variables and re-training, a set of features, derived from particular sensor-kernel combinations, can be arrived at that achieves good discrimination between equipment states.

Once a discriminatory set of features is identified, the final classification system must be trained in Step 114. Random Forests, neural networks, support vector machines, or any of a number of other algorithms may be used for this.

There are several parameters (e.g., thresholds) that need to be set. There are at least four options for setting them:
1. using fixed defaults for all settings
2. manually
3. using some automated search mechanism, e.g., evolutionary algorithm
4. some combination of the 1-3.

There is a clear tradeoff in time and accuracy in options 1-3. Option one is the fastest, but least accurate. Option two may take a small amount of time, but will result in considerable gain in accuracy. Option three will take the most time, but will be the most accurate.

Figure 5:
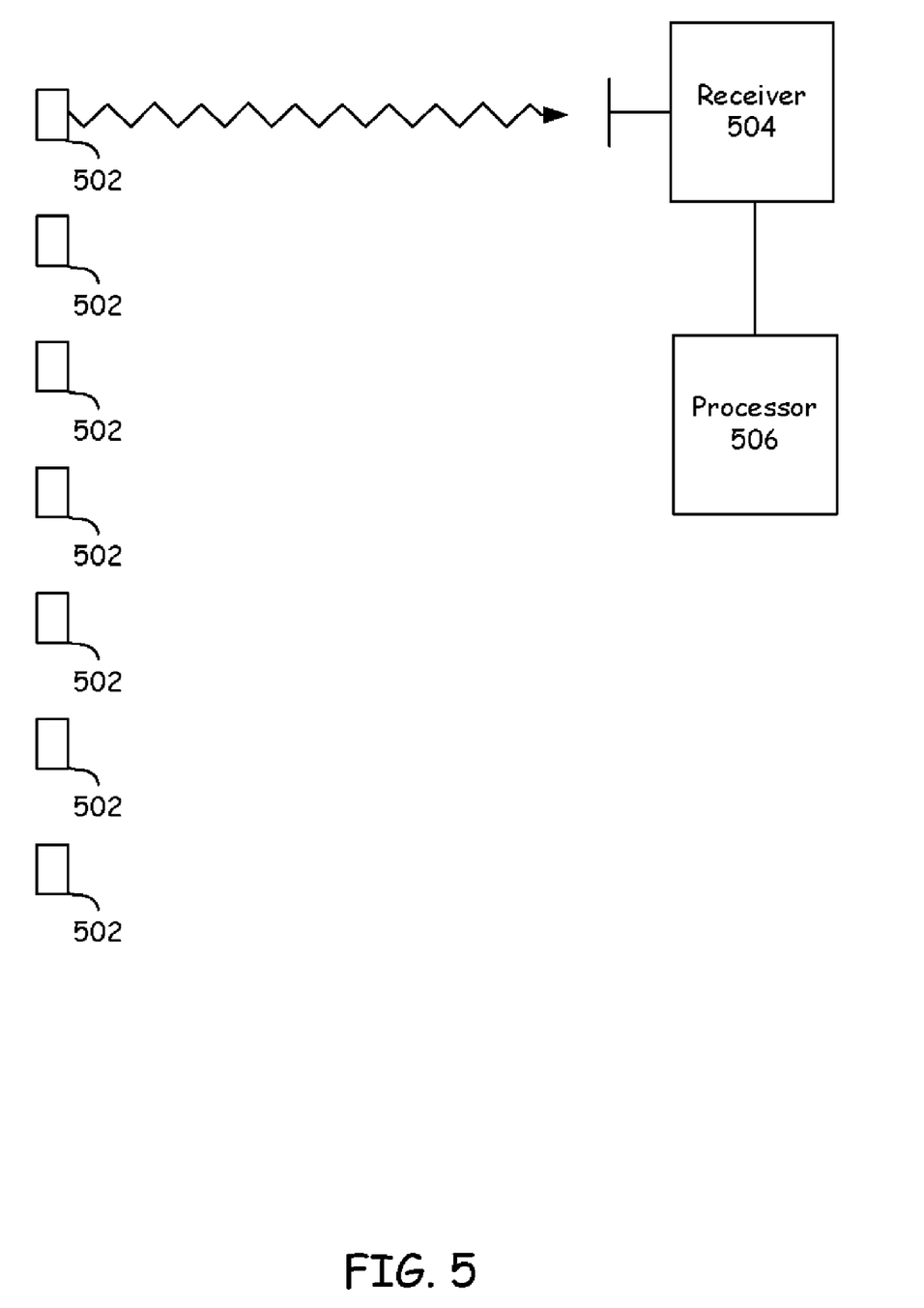
FIG. 5 depicts a system where sensors data to a processor operable to develop a fault classification system in accordance with embodiments of the present invention.

In one example as illustrated in FIG. 5, the algorithm provided by embodiments of the present invention was implemented using data that included multiple time series for different variables obtained under normal operating as well as fault-induced conditions. FIG. 5 depicts a system where sensors 502 wirelessly transmit data to a receiver 504 which in turn provides the raw data to a processor 506. The receiver 504 and processor 506 may be located within a system such as an aircraft and use algorithms as taught by the present invention in order to identify discriminating features. Alternatively sensors 502 may be coupled via wires to a processor 506 or memory not shown wherein the memory provides the raw data to a processor such as processor 506 for processing using the algorithm provided by the present invention. The processor may be within the system to be monitored or an external processor that processes recorded data.

The processing module (processor 506) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in FIGS. 1 through 4.

The goal is to use this data in order to detect the presence of a fault condition. Since we have data points explicitly collected under known fault conditions, we can use supervised techniques whereby algorithms can be designed to learn characteristics of the monitored data under faulty conditions and use that knowledge to test for the presence of a fault condition in the device. The technique depends upon the hypothesis that faulty condition results in a certain recurrent pattern in the time-series data, whereas this pattern is not present in normal data. We refer to this pattern as a 'kernel'. These techniques comprise extracting all such potential kernels from the faulty data and using them for diagnostic purposes. In order to use a kernel to test a given time series, one need merely look for the presence of such a kernel on the given time-series data by using a convolution operation. This operation indicates whether or not the kernel is present in the given time-series and this information is used to indicate whether or not the given time-series pertains to a faulty condition.

Conceptually, the methods taught by embodiments of the present invention search through the data and identify change points using criteria derived from statistical properties of the data. These change points are used to segment the data, and find potentially discriminatory kernels by combining adjacent segments. The candidate kernels are evaluated using the Random Forest classification technique, or other like techniques known to those having skill in the art, and highly discriminating kernels are identified by this means.

Embodiments of the present invention describe a method and system operable to provide automatically developing a fault classification system from time series data. The sensors need not have been intended for diagnostic purposes (e.g., control sensors). These embodiments are functionally independent of knowledge related to a particular equipment system, thereby allowing seamless application to multiple systems, regardless of the suite of sensors in each system. Because this algorithm is totally automated, substantial savings in time and development cost can be achieved. The algorithm provided results in a classification system and a set of features that might be used to develop alternative classification systems without human intervention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method for automated segregation of kernels, comprising:
    collecting sensor data in a time series format;
    labeling sensor data in a time series format as either normal, or one of one or more possible faults;
    segmenting sensor data in a time series format into blocks having a substantially uniform slope with respect to time;
    labeling the blocks as having a rising, falling, or flat slope;
    joining adjacent blocks with slopes having a same sign;
    identifying candidate kernels;
    convoluting the sensor data in a time series format with candidate kernels;
    applying a feature selection method to determine which kernels have discriminatory power; and
    training a fault classification system based on kernels having discriminatory power.

2. The method of claim 1, wherein collected sensor data comprises pressure, temperature, and speed information.

3. The method of claim 1, wherein labeling the blocks comprises applying statistical criteria, manually set thresholds, or fuzzy logic.

4. The method of claim 1, wherein Kernels comprise regions containing at least one region of non-zero slopes between regions of a substantially zero slope.

5. The method of claim 1, wherein the feature selection method comprises variable importance statistic from the Random Forests (RF).

6. The method of claim 1, wherein training the fault classification system comprises applying Random Forests, neural networks, or support vector machines.

7. A method operable to develop a fault classification system based on the extracted features, comprising:
    collecting sensor data in a time series format;
    labeling sensor data in a time series format as either normal, or one of one or more possible faults;
    segmenting sensor data in a time series format into blocks having a substantially uniform slope with respect to time;

labeling the blocks as having a rising, failing, or flat slope;
joining adjacent blocks with slopes having a same sign;
identifying candidate kernels;
convoluting the sensor data in a time series format with candidate kernels;
applying a feature selection method to determine which extracted features have discriminatory power; and
training a fault classification system based on extracted features having discriminatory power.

8. The method of claim 7, wherein collected sensor data comprises pressure, temperature, and speed information.

9. The method of claim 7, wherein labeling the blocks comprises applying statistical criteria, manually set thresholds, or fuzzy logic.

10. The method of claim 1, wherein Kernels comprise regions containing at least one region of non-zero slopes between regions of a substantially zero slope.

11. The method of claim 7, wherein the feature selection method comprises variable importance statistic from the Random Forests (RF).

12. The method of claim 7, wherein training the fault classification system comprises applying Random Forests, neural networks, or support vector machines.

13. A method operable to generating classifier systems for univariate or multivariate equipment sensor data, comprising:
collecting univariate or multivariate equipment sensor data in a time series format;
labeling univariate or multivariate equipment sensor data in a time series format as either normal, or one of one or more possible faults;
segmenting univariate or multivariate equipment sensor data in a time series format into blocks having a substantially uniform slope with respect to time;
labeling the blocks as having a rising, falling, or flat slope;
joining adjacent blocks with slopes having a same sign;
identifying candidate kernels;
convoluting the univariate or multivariate equipment sensor data in a time series format with candidate kernels;
applying a feature selection method to determine which extracted features have discriminatory power; and
training a fault classification system based on extracted features having discriminatory power.

14. The method of claim 13, wherein collected univariate or multivariate equipment sensor data comprises pressure, temperature, and speed information.

15. The method of claim 13, wherein labeling the blocks comprises applying statistical criteria, manually set thresholds, or fuzzy logic.

16. The method of claim 13, wherein extracted features comprise regions containing at least one region of non-zero slopes between regions of a substantially zero slope.

17. The method of claim 13, wherein the feature selection method comprises variable importance statistic from the Random Forests (RF).

18. The method of claim 13, wherein training the fault classification system comprises applying Random Forests, neural networks, or support vector machines.

19. A system operable to develop a fault classification system based on the extracted features, comprising:
a data collection system operable to gather and store sensor data in a time series format; and
a processing system operable to:
receive the sensor data in a time series format;
label the sensor data in a time series format as either normal, or one of one or more possible faults;
segment sensor data in a time series format into blocks having a substantially uniform slope with respect to time;
label the blocks as having a rising, falling, or flat slope;
join adjacent blocks with slopes having a same sign;
identifying candidate kernels;
convolute the sensor data in a time series format with candidate kernels;
apply a feature selection method to determine which extracted features have discriminatory power; and
train a fault classification system based on extracted features having discriminatory power.

20. A system operable to generating classifier systems for univariate or multivariate equipment sensor data, comprising:
a data collection system operable to gather and store univariate or multivariate equipment sensor data in a time series format; and
a processing system operable to:
receive the univariate or multivariate equipment sensor data in a time series format;
label the univariate or multivariate equipment sensor data in a time series format as either normal, or one of one or more possible faults;
segment univariate or multivariate equipment sensor data in a time series format into blocks having a substantially uniform slope with respect to time;
label the blocks as having a rising, falling, or flat slope;
join adjacent blocks with slopes having a same sign;
identifying candidate kernels;
convolute the univariate or multivariate equipment sensor data in a time series format with candidate kernels;
apply a feature selection method to determine which extracted features have discriminatory power; and
train a fault classification system based on extracted features having discriminatory power.

* * * * *

UNITED STATES PATENT AND TRADEMARK OFFICE
CERTIFICATE OF CORRECTION

| | | |
|---|---|---|
| PATENT NO. | : 7,814,034 B2 | Page 1 of 1 |
| APPLICATION NO. | : 11/755893 | |
| DATED | : October 12, 2010 | |
| INVENTOR(S) | : Neil Holger White Eklund et al. | |

It is certified that error appears in the above-identified patent and that said Letters Patent is hereby corrected as shown below:

In the specification:

On Column 1, line 16, delete "13/000,001" and after "No." insert --11/755,898-- and on line 24, delete "13/000,002" and after "No." insert --11/755,924--.

Signed and Sealed this
Twelfth Day of April, 2011

David J. Kappos
*Director of the United States Patent and Trademark Office*